United States Patent
Weisshaar et al.

(10) Patent No.: US 6,947,760 B2
(45) Date of Patent: Sep. 20, 2005

(54) METHOD OF OPTIMIZING THE TRANSMISSION OF DATA IN A WIRELESS COMMUNICATION NETWORK

(75) Inventors: Bernhard P. Weisshaar, Phoenix, AZ (US); Richard M. Clayton, Phoenix, AZ (US); Kungwel Liu, Chandler, AZ (US)

(73) Assignee: Motorola, Inc., Schaumburg, IL (US)

( * ) Notice: Subject to any disclaimer, the term of this patent is extended or adjusted under 35 U.S.C. 154(b) by 661 days.

(21) Appl. No.: 10/037,559

(22) Filed: Jan. 4, 2002

(65) Prior Publication Data

US 2003/0129961 A1 Jul. 10, 2003

(51) Int. Cl.$^7$ .......................... H04M 1/00; G08G 1/123
(52) U.S. Cl. ....................... 455/509; 455/403; 455/557; 455/575.9; 455/556.1; 701/1; 340/988
(58) Field of Search ................................ 455/403, 517, 455/509, 556.1, 557, 575.9, 556, 575; 701/1; 340/988

(56) References Cited

U.S. PATENT DOCUMENTS

| 6,023,232 A | * | 2/2000 | Eitzenberger | 340/988 |
| 6,505,100 B1 | * | 1/2003 | Stuempfle et al. | 701/1 |
| 6,629,183 B1 | * | 9/2003 | Gortz et al. | 710/305 |
| 2002/0025832 A1 | * | 2/2002 | Durian et al. | 455/556 |

* cited by examiner

Primary Examiner—Nick Corsaro
Assistant Examiner—Alan T. Gantt
(74) Attorney, Agent, or Firm—Kevin D. Wills

(57) ABSTRACT

A method of optimizing the transmission of data in a wireless communication network is disclosed. The method comprises the steps of acquiring a first communication interface of a plurality of communication interfaces to transmit data associated with a first application for a first period of time; transmitting a first block of data on the first communication interface for a second period of time which is less than the first period of time; and transmitting a second block of data associated with a second application on said first communication interface for at least a portion of the first period of time remaining after the second period of time.

5 Claims, 6 Drawing Sheets

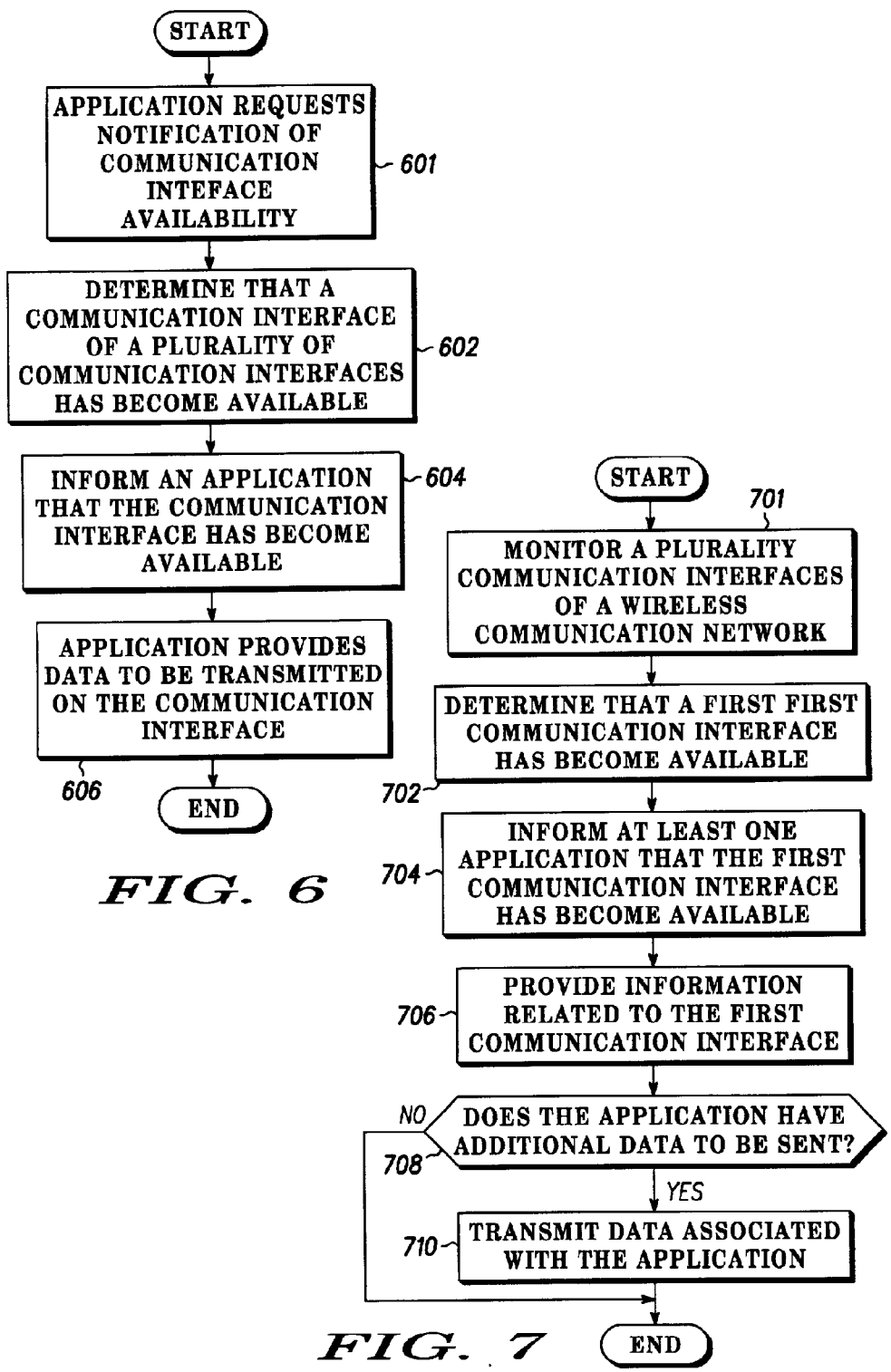

METHOD OF OPTIMIZING THE TRANSMISSION OF DATA IN A WIRELESS COMMUNICATION NETWORK

RELATED INVENTIONS

This invention is related to the following inventions which have at least one common inventor, which are assigned to the same assignee as the present invention, and which were filed on the same date:

U.S. patent application Ser. No. 10/038,026 entitled "METHOD OF ENABLING THE TRANSMISSION OF DATA IN A WIRELESS COMMUNICATION NETWORK" (TC00151), and U.S. patent application Ser. No. 10/038,433 entitled "METHOD OF SELECTING A COMMUNICATION INTERFACE TO TRANSMIT DATA IN A WIRELESS COMMUNICATION NETWORK" (TC00152).

FIELD OF THE INVENTION

This invention relates generally to communication systems, and in particular, to a method of optimizing the transmission of data in a wireless communication network.

BACKGROUND OF THE INVENTION

There is an ever increasing demand for wireless communications. Wireless subscribers desire to have access to information at any time and at any place. One of the fastest growing markets for providing wireless services is known as "telematics" and entails delivering a wide spectrum of information via wireless links to vehicle-based subscribers. The information can originate from multiple sources, such as the Internet and other public, private, and/or government computer-based networks; wireless telecommunications such as cellular, Personal Communication Service (PCS), satellite, land-mobile, and the like; terrestrial and satellite direct broadcasts including traditional AM/FM bands, broadband, television, video, geolocation and navigation via a global position system (GPS), and the like; concierge services providing roadside assistance, emergency calling, remote-door unlocking, accident reporting, travel conditions, vehicle security, stolen vehicle recovery, remote vehicle diagnostics, and the like; advertising services identifying names and locations of businesses such as gas stations, restaurants, hotels, stores, and offices, and the like; tourist services such as points of interest, directions, hours of access, and the like; and many other sources that can provide information of any type. Many of the above services are not universally available, but rather they are transient in both the time and geoposition domains.

Information can be communicated to telematics devices over relatively long wireless links, such as from a satellite or terrestrial node, or from relatively short wireless or wired links, such as from in-vehicle equipment or from hand-held devices like PDAs, portable computers, cellular phones, and the like. The services provided by telematics systems are not restricted to vehicle-based subscribers, and they can also be provided to subscribers at home, at work, or elsewhere.

As telematics communication systems continue to evolve, a telematics communication unit of a vehicle will have a greater number of communication interfaces. However, as for any wireless communication device which is mobile, the device could move in and out of areas which are covered by various wireless communication networks. Further, the various wireless communication networks which may be available to a telematics communication unit of a vehicle have different communication capabilities and characteristics, such as bandwidth, or bit rate, error rate, latency, etc. These different communication networks may also have different costs associated with the transmission of data. Accordingly, there is a need for a method of optimizing the transmission of data in a wireless communication network in order to provide services at an efficient cost.

BRIEF DESCRIPTION OF THE DRAWINGS

FIG. 6 is a flow chart showing a method for enabling the transmission of data in a wireless communication network according to the present invention;

FIG. 7 is a flow chart showing a method for enabling the transmission of data in a wireless communication network according to an alternate embodiment of the present invention;

DESCRIPTION OF THE PREFERRED EMBODIMENTS

Figure 1:
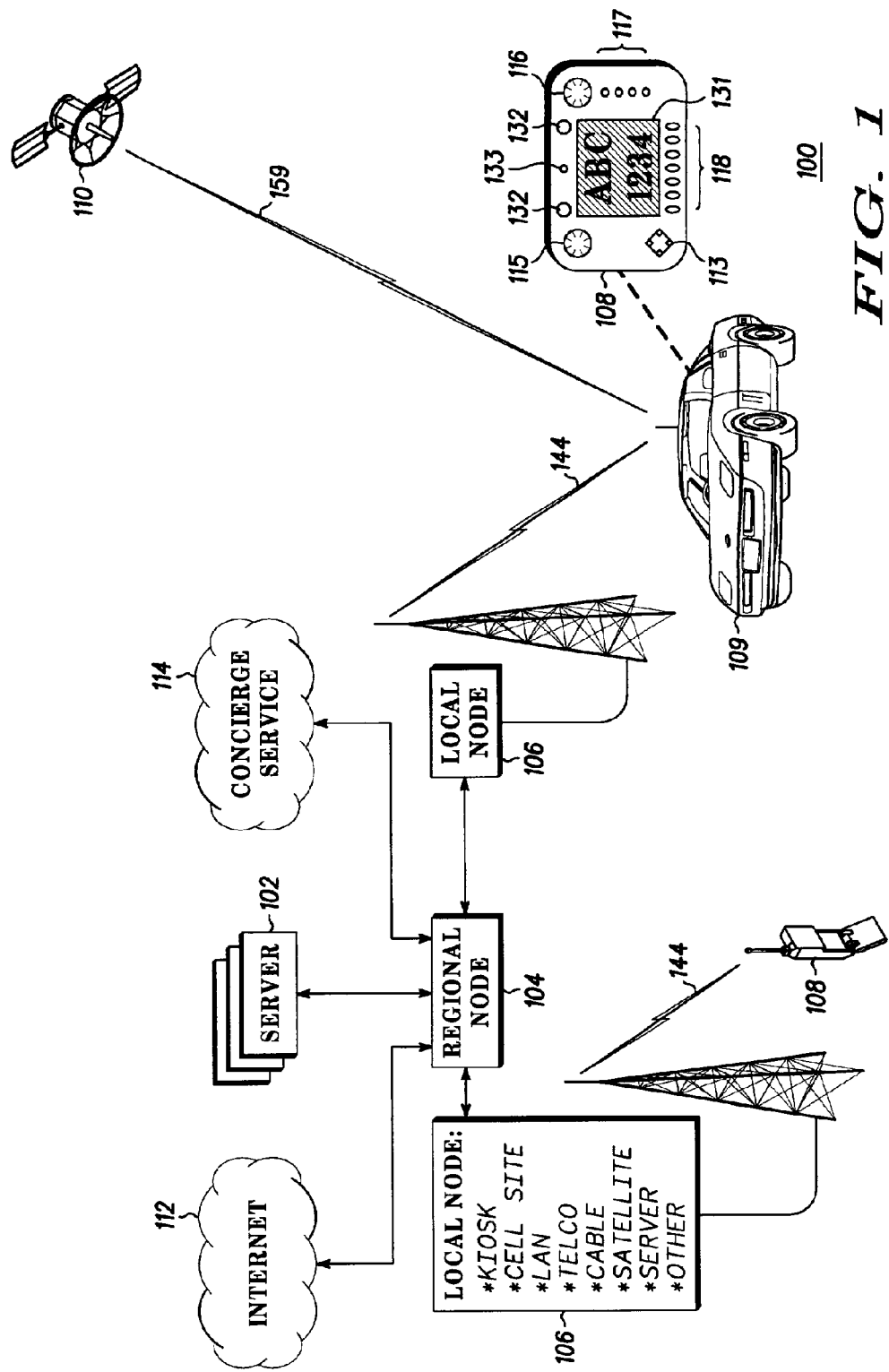
FIG. 1 is a block diagram showing an exemplary information appliance system according to the present invention.

Turning first to FIG. 1, an exemplary information appliance system 100, according to one embodiment of the invention, is shown. Shown in FIG. 1 are examples of components of the information appliance system 100, which comprises a plurality of servers 102 coupled to a regional node 104, and a plurality of local nodes 106 coupled to the regional node 104. There can be any number of servers 102, regional nodes 104, and local nodes 106 within the information appliance system 100. The regional node 104 can be coupled to a network, such as the Internet 114, and to any number of concierge services 112.

Servers 102, while illustrated as coupled to regional node 104, could be implemented at any hierarchical level(s) within information appliance system 100. For example, servers 102 could also be implemented within one or more local nodes 106, concierge service 112, and Internet 114. Without limitation, local node 106 can be a kiosk, cell site, local area network (LAN), telephone company, cable company, satellite, or any other information service, structure, or entity that can transmit, receive, and/or communicate information. An information service can be any desired service including, but not limited to, telecommunications, broadband communications, entertainment, television, radio, recorded music, movies, computer-based games, Internet, and other types of public, private, personal, commercial, government, and military communications.

Local node 106 is coupled to any number of user nodes 108 via wireline or wireless interface means. In the embodiment depicted in FIG. 1, user nodes 108 can transmit and receive information using wireless communications means. User nodes 108 without limitation can include a wireless unit such as a cellular or Personal Communication Service (PCS) telephone, a pager, a hand-held computing device such as a personal digital assistant (PDA) or Web appliance, or any other type of communications and/or computing device. Without limitation, one or more user nodes 108 can be contained within, and optionally form an integral part of a vehicle, such as a car 109, truck, bus, train, aircraft, boat, etc. As indicated above, a user node 108 can also be implemented in a device that can be carried by the user of the information appliance system 100.

In one embodiment, a user node 108 comprises an in-vehicle information appliance comprising various human interface (H/I) elements such as a display 131, a multi-position controller 113, one or more control knobs 115 and 116, one or more indicators 117 such as bulbs or light emitting diodes (LEDs), one or more control buttons 118, one or more speakers 132, a microphone 133, and any other H/I elements required by the particular applications to be utilized in conjunction with the information appliance. User nodes 108 can also transmit and/or receive data to and from devices and services other than local node 106. For example, user nodes 108 can transmit and receive data to and from a satellite 110.

The information appliance system 100 including the user nodes 108 is preferably capable of utilizing audio data in any number of encoding methods from any number of sources that include, but are not limited to, ADPCM (adaptive differential pulse-code modulation); CD-DA (compact disc—digital audio) digital audio specification; and ITU (International Telecommunications Union) Standards G.711, G.722,G.723 & G.728. The information appliance system 100 including the user nodes 108 is also preferably capable of utilizing video data in any number of encoding methods from any number of sources that include, but are not limited to, ITU Standards H.261 & H.263; Motion JPEG (Joint Photographic Experts Group); and MPEG-1, MPEG-2 and MPEG-4 (Motion Picture Experts Group) standards. Finally, the information appliance system 100 is preferably capable of utilizing audio and video data in any number of formats and using any type of transport technology that include, but are not limited to, USB (Universal Serial Bus); IEEE (Institute of Electrical and Electronics Engineers) Standards 1394-1995; and IEEE 802.11; and using protocols such as HTTP (hypertext transfer protocol); TCP/IP (transmission control protocol/Internet protocol); and UDP/IP (user datagram protocol/Internet protocol).

Figure 2:
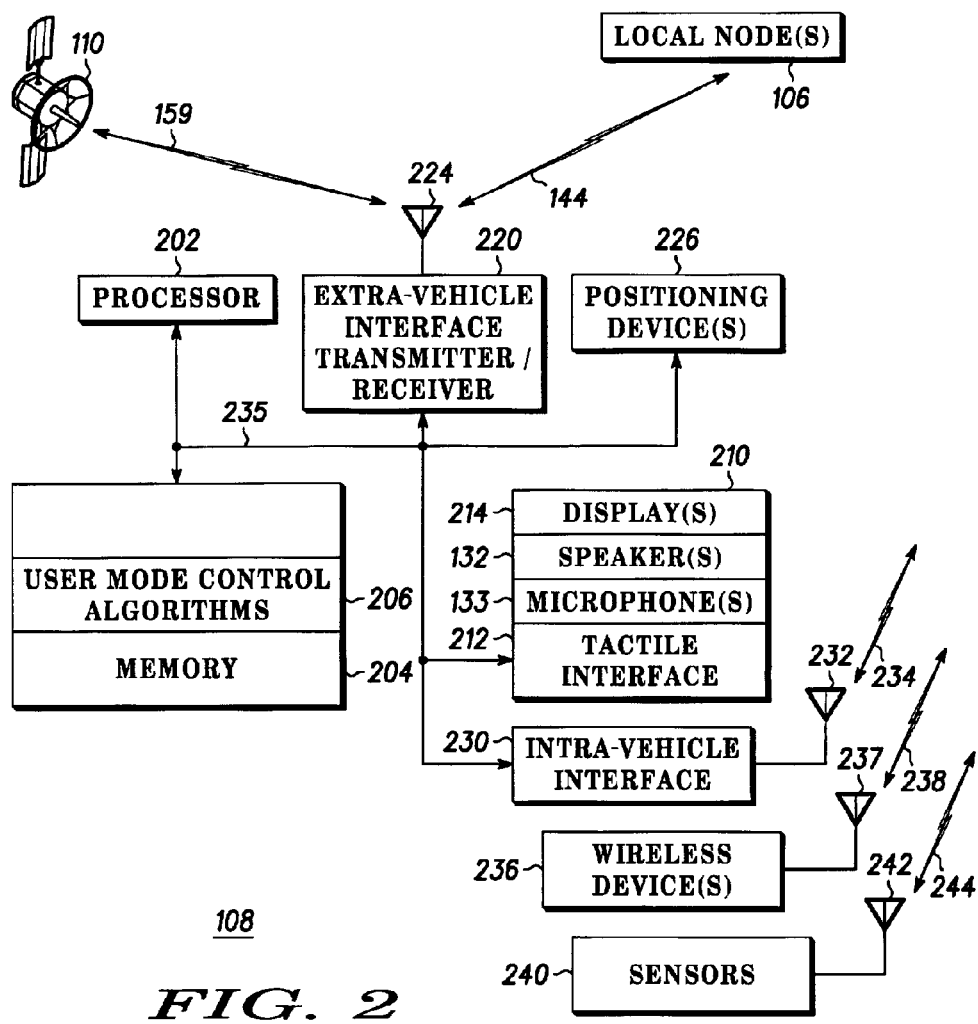
FIG. 2 is a block diagram showing a user node of an exemplary information appliance system according to the present invention.

FIG. 2 depicts an exemplary user node 108 of the information appliance system 100. As indicated above, user node 108 can without limitation be located within or be an integral part of any vehicle. As shown in FIG. 2, the user node 108 comprises a processor 202 with associated user node memory 204. User node memory 204 can include, but is not limited to, random access memory (RAM), read only memory (ROM), flash memory, and other memory such as a hard disk, floppy disk, and/or other appropriate type of memory. User node memory 204 also preferably comprises user node control algorithms 206. User node 108 can initiate and perform communications with other nodes shown in FIG. 1 in accordance with suitable computer programs, such as user node control algorithms 206, stored in user node memory 204.

User node 108 also comprises a user interface device 210 that can include without limitation a tactile interface 212, microphone 133, speakers 132, any number of displays 214, and the like. Extra-vehicle interface 220, typically implemented as a communication interface having a transmitter/receiver for transmitting and receiving communications via a wireless link 144 among the various nodes depicted in FIG. 1, also facilitates communications among other devices via wireless link 159, for example, satellite 110, and the like. Communications are transmitted and received through one or more antennas 224 of any type, which can include any one or combination of a fixed, steerable, omni-directional, or phased array antenna. Steerable antenna can include, but is not limited to, an electronically steerable antenna, physically steerable antenna, and the like. User node 108 can also include positioning devices 226 of any type, for example, global positioning system (GPS), gyroscope, compass, accelerometer, altimeter, rate sensors, and other positioning devices that can define the position, attitude, and/or motion vector of the user node 108.

User node 108 can also comprise an intra-vehicle interface 230, which can include antenna 232. Intra-vehicle interface 230 also acts as a communication interface and can include multiple types of transceivers (not shown) and antennas 232 to implement different short-range wireless protocols, such as Bluetooth™, IEEE wireless local area network (LAN) standard 802.11, and infrared via wireless link 234. Intra-vehicle interface 230 is capable of short-range wireless communications with other wireless devices 236 and sensors 240 of any type, for example, wireless telephones, computers, pagers, PDA's, entertainment devices, printers, fax machines, wireless local networks such as Bluetooth™, vehicle sensors, vehicle actuators, vehicle displays, and the like. It should be noted that the wireless devices 236 also provide communication interfaces. In addition, intra-vehicle interface 230 can be used to communicate with wireless devices that are physically outside the vehicle but close to the vehicle, such as a service station kiosk. One or more wireless devices 236 can comprise one or more antennas such as antenna 237 and communicate via wireless link 238. One or more sensors 240 can comprise one or more antennas such as antenna 242 and communicate via wireless link 244. In one embodiment, the various components and systems in FIG. 2 can communicate with each other via a wireline link 235, for example, a power/data/control bus, and the like. In another embodiment, some of the various components and systems in FIG. 2 could communicate via a wireless link.

Figure 3:
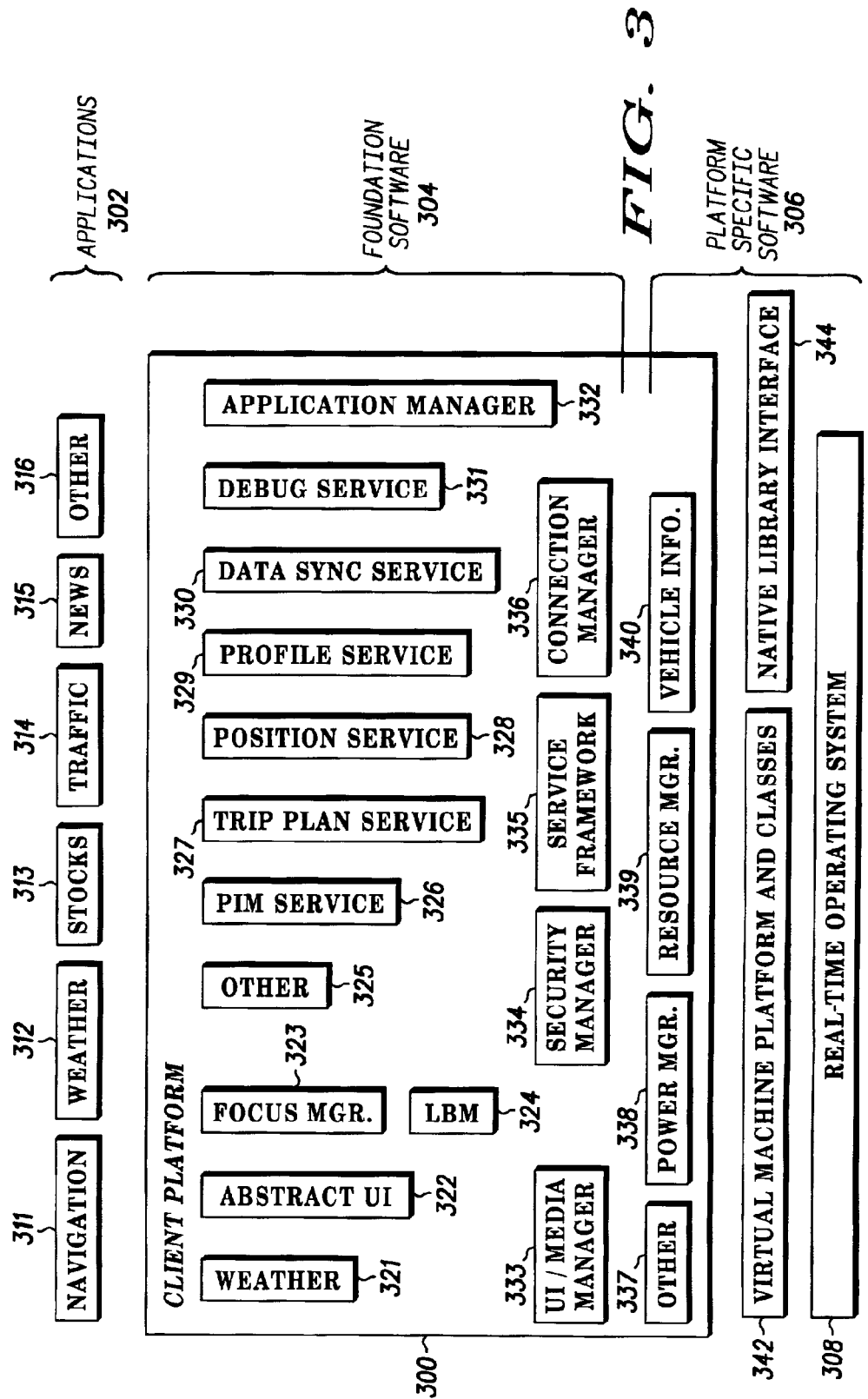
FIG. 3 is a block diagram showing the major functional software blocks of a client platform according to the present invention.

Turning now to FIG. 3 major functional software blocks of a client platform 300 in accordance with one embodiment of the invention are shown. Architecturally, the user node 108 comprises a software-based client platform 300 that supports a wide range of applications and services. This provides great flexibility and allows the user platform's feature set to be readily expanded or updated after the user node 108 has been deployed into its intended market.

These software blocks are computer program modules comprising computer instructions, such as user node control algorithms 206, that are stored in a computer-readable medium such as user node memory 204. These software modules are merely representative of one embodiment of the invention. In other embodiments, additional modules could be provided as needed, and/or unneeded modules could be deleted.

The software blocks include the following modules, each of which is briefly summarized below according to its reference numeral in FIG. 3. The client platform software comprises three general layers: applications 302, foundation software 304 upon which the applications 302 are supported, and platform-specific software 306. In one embodiment, the upper two layers are implemented in the Java™ programming language, available from various suppliers, including Sun Microsystems, Inc., Palo Alto, Calif. One advantage of the Java™ programming language is the support of code distribution in a platform-independent manner.

The lowest layer, i.e. the platform-specific software 306, comprises a real-time operating system 308, a virtual machine platform (such as the Java™ 2 Virtual Machine, available from Sun Microsystems, Inc.) and associated classes 342, and a native library interface 344.

Referring to FIG. 3, applications 302 can comprise an extremely wide variety of informational, safety, query, communications, entertainment, and other applications, for example navigation 311, weather 312, stocks 313, traffic 314, news 315, and others 316 of any type. As used herein, an "application" is defined as any computer program that provides one or more functions that are of interest to a user of the information appliance system 100.

Foundation software 304, in one embodiment, comprises the following modules, each of which will now be discussed.

Selector module 321 launches and controls applications selected by the user. It is user-configurable.

Abstract user interface (UI) 322 supports a wide variety of input/output (I/O) functions that enable the user to interact with the user device.

Focus manager 323 enforces priority-based access to UI and media resources. Focus manager 323 also controls interactions between synchronous applications and asynchronous notifications and alerts.

Logical button manager (LBM) 324 allows an application to map logical buttons to actual physical buttons on a user device. It allows physical buttons to be referenced by logical names. It manages different sets of buttons, such as preset buttons, application buttons, and so on.

Personal information manager (PIM) service 326 supports functions to enhance user productivity, such as an address book, a calendar, a memo management capability, and so forth. The address book can comprise information that is up-loaded from a PDA, entered by voice or by keys from the user, downloaded from the Internet, and so forth.

Trip plan service 327 provides a variety of trip-planning functions, such as route and map retrieval, route-planning, determination of route distance, etc.

Position service 328 provides abstract positioning application programming interfaces (API) to support a variety of position-determining mechanisms, such as GPS, differential GPS, in-road transmitters, cellular base stations, etc.

Profile service 329 provides server-based profiles for users, devices, vehicles, etc. It assists in the application configuration. It can also ensure that user profiles are portable from one user vehicle to another.

Data sync service 330 synchronizes one or more databases on client platform 200 with counterpart databases on a server platform.

Debug service 331 provides debug functions to isolate, examine, and correct errors in the operation of the software residing on the client platform 200.

Application manager 332 controls the installation and updating of applications, including security attributes of the applications.

User interface manager/media manager 333 manages the user interface, e.g. what entities can access what portions of a display screen (in the case of the user interface manager), and manages all aspects of audio and video functions, e.g. radio, voice-recognition, sound clips, etc. (in the case of the media manager).

Security manager 334 provides permission and policy restraints within the client platform 300.

Service framework 335, to which the current invention pertains, is responsible for locating, connecting, and controlling services required by applications 302 and other services. Additional description of the service framework 335 is provided elsewhere herein.

Other modules 325 can also be provided within the foundation software 304 of the client platform 300, depending upon the functional requirements of the client platform 300.

Platform specific software 306, in one embodiment, comprises the following modules, each of which will now be discussed.

Power manager 338 provides power status change events to applications, such as "power on", "power off", "sleep/accessory mode", etc. It can enforce a low-power mode in emergency situations, reserving power to the highest priority functions. It can also monitor power consumption to identify elements that may be consuming unreasonable amounts of power.

Resource manager 339 manages priority-based access to system resources, such as a processor, threads being processed, memory elements, and persistent storage. The resource manager 339 can ensure the required resources to support an emergency call by halting or suspending lower priority applications.

Vehicle information 340 provides information to support primarily mission-critical vehicular functions. It comprises information to control certain in-vehicle functions, such as remote door unlock. It comprises status information from the in-vehicle system, e.g. vehicular speed. It also can comprise information derived from integrated vehicle components, such as global positioning information from an in-vehicle GPS system.

Other modules 337 can also be provided within the platform specific software 306 of the client platform 300, depending upon the functional requirements of the client platform 300. Additional information regarding client platform 300 as well as a service platform can be found in co-pending U.S. application Ser. No. 09/662,441, (TC00033) entitled "Service Framework with Hidden Services", filed on Sep. 15, 2000 and having a common inventor as the inventor of the present application, which application is incorporated in its entirety by reference.

Finally, connection manager 336 manages connection(s) of the client platform 300 to one or more networks, such as geographically distributed cellular and server networks. It ensures continuity of sessions across physical and/or logical network interfaces. It can require security (e.g. authentication, encryption, etc.) as a precondition to a connection. It can ensure that low bandwidth connections are used efficiently. More specifically, the connection manager manages multiple interfaces and reports concurrent use of more than one interface, either by the same or different applications. The connection manager also enables an interface to be used for both streams and datagrams at the same time. In particular, the transport layer enables the flow of data between two hosts for an application. Streams are transmitted by the connection oriented transmission control protocol (TCP) which enables the reliable flow between two hosts by dividing data into blocks and receiving acknowledgments when the data is received. In contrast, datagrams are transmitted by the less reliable user datagram protocol (UDP), which is also well known in the art.

Figure 4:
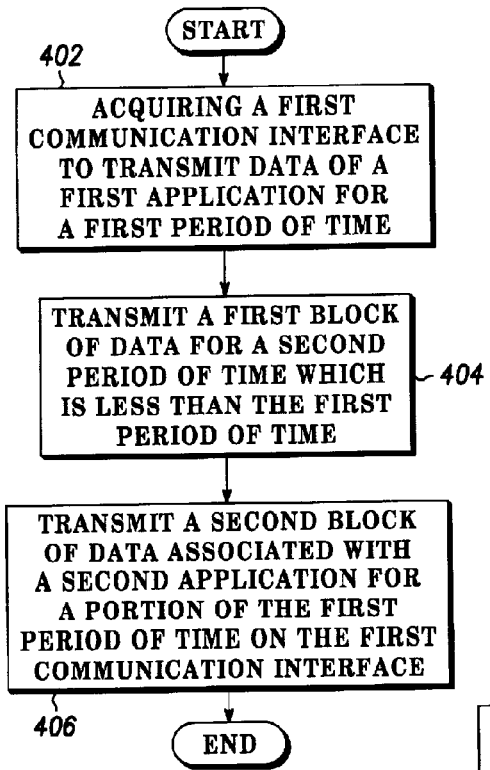
FIG. 4 is a flow chart showing a method for optimizing the transmission of data in a wireless communication network according to the present invention.

Turning now to FIG. 4, a flow chart shows a method of optimizing the transmission of data in a wireless communication network according to the present invention. In particular, a first communication interface to transmit data of a first application is acquired for a first period of time at a step 402. The first communication interface could be any wireless communication interface, such as a cellular, satellite, land mobile, paging, or other wireless communication device provided by extra vehicular interface transmitter/receiver 220 or intra-vehicle interface 230 of FIG. 2. The user node 108 of the vehicle could acquire the first communication interface for a predetermined time, such as a predetermined number of minutes. The user node 108 of the vehicle then transmits a first block of data for a second period of time which is less than the first period of time at a step 404. That is, the user node 108 transmits data associated with a first application on the first communication interface for a period of time which is less than the first period of time for which it acquired the communication interface. The wireless communication device of the vehicle then transmits a second block of data associated with a second application for a portion of a first period of time on the first communication interface at a step 406. Accordingly, the remaining portion of the first period of time which is not used for transmitting data related to a first application can be used to transmit data related to a second application.

Figure 5:
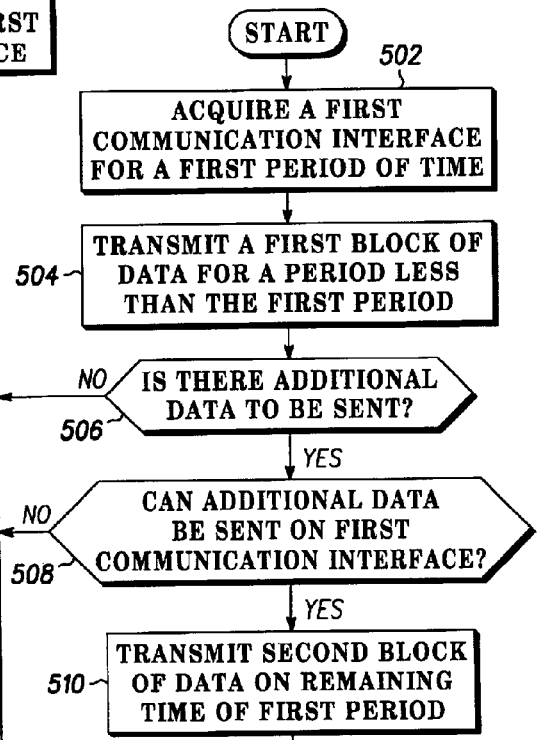
FIG. 5 is a flow chart showing a method for optimizing the transmission of data in a wireless communication network according to an alternate embodiment of the present invention.

Turning now to FIG. 5, a flow chart shows a method for optimizing the transmission of data in a wireless communication network according to an alternate embodiment of the present invention. A first communication interface is acquired for a first period of time at a step 502. The first communication interface could be provided by any wireless communication interface associated with the user node 108 described in reference to FIG. 2. For example, the communication interface could enable wireless communications on any cellular, paging, satellite or other wireless communication network. A first block of data associated with a first application is transmitted on the first communication interface for a period of time less than the first period of time at a step 504. It is then determined whether additional data associated with a second application is available to be sent at a step 506. If there is additional data associated with a second application to be sent, it is then determined whether the additional data can be sent on the first communication interface at a step 508. That is, assuming that the user node 108 is within range of the wireless communication network associated with the communication interfaces, it is determined whether the available bandwidth, latency bit, rate, error rate, cost or other channel parameters are acceptable to transmit data associated with the second application. If the additional data can be sent, a block of data is associated with the second application transmitted on the remaining time of the first period of time at a step 510.

The method of FIGS. 4 and 5 finds particular application when capacity on a wireless communication is sold in a block of time, such as a predetermined number of minutes. Because the user has already been charged for the entire first period of time, any use of the remaining portion of time is financially beneficial to the subscriber of the telematics communication services having the user node 108. Although the cost of transmitting data on the first communication interface may be greater than the desired cost associated with the second application, it is still financially beneficial to utilize the remaining portion of the first period of time on the first communication interface to transmit data for the second application. Preferably, the transmission of data on the second application would be "billed" or allocated to the second application at the normal or desired rate for the second application, which may be less than the normal rate for the first communication interface.

Turning now to FIG. 6, a flow chart shows a method of enabling transmission of data in a wireless communication network according to the present invention. In particular, an application, such as one of the applications described in reference to FIG. 3, requests notification of the availability of a communication interface at a step 601. For example, an application of FIG. 3 could request that the connection manager 336 notify it when a communication interface meeting certain criteria becomes available. The communication interface could be any communication interface described in reference to FIG. 2. It should be noted that the applications may have varying requirements which could be met by different interfaces, while a number of different communication interfaces may be acceptable for a given application.

It is determined that a communication interface of a plurality of communication interfaces has become available at a step 602. An application is then informed that a desirable communication interface has become available at a step 604. The application then provides data to be transmitted on the communication interface at a step 606. Accordingly, an application is informed of the availability of a communication interface and can determine whether it desires to make data available for transmission when a particular communication interface is available.

Turning now to FIG. 7, a method for enabling the transmission of data in a wireless communication network according to an alternate embodiment of the present invention is shown. A plurality of communication interfaces of a wireless communication device are monitored at a step 701. It is then determined whether a first communication interface has become available at a step 702. At least one application is then informed, for example, by the connection manager 336, that the first communication interface has become available at a step 704. Information related to the first communication interface is then provided to the application at a step 706. For example, information related to the characteristics of the communication interface are provided to the application to enable the application to determine whether the communication interface is acceptable for transmitting data. Alternatively, the application could be informed that a particular communication interface is available only if the communication interface is known to be acceptable for the application.

It is then determined whether an application has data to be sent at a step 708. If the application has additional data to be sent and the first communication interface is appropriate for the application, the application provides the data to be transmitted by the communication interface at a step 710. Accordingly, by informing the application that a particular communication interface is available, an application can determine whether it is desirable to transmit data on the available communication interface.

Figure 8:
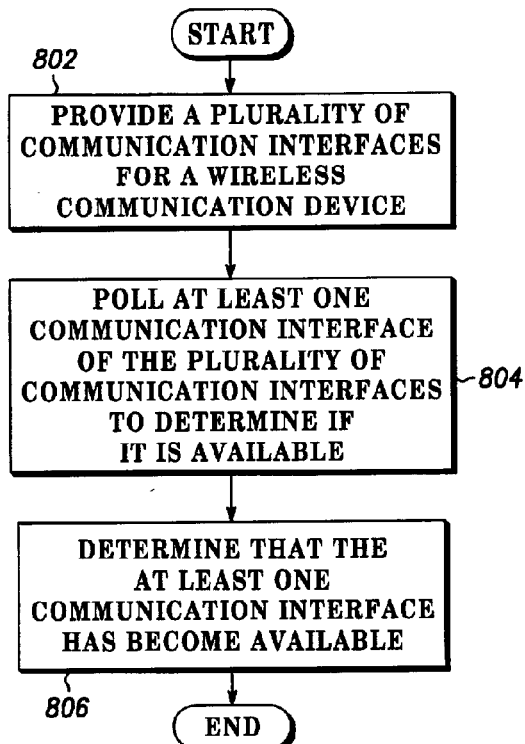
FIG. 8 is a flow chart showing a method of selecting a communication interface to transmit data in a wireless communication network according to the present invention.

Turning now to FIG. 8, a flow chart shows a method of selecting a communication interface to transmit data in a wireless communication network according to the present invention. In particular, a plurality of communication interfaces, such as the communication interface related to user node 108 and described in reference to FIG. 2, are provided for a wireless communication device, such as user node 108, at a step 802. At least one communication interface of the plurality of communication interfaces is polled by an application, such as an application described in reference to FIG. 3, to determine if it is available at a step 804. It is then determined that the at least one communication interface has become available at a step 806. By enabling the application to poll the communication interfaces, the application can acquire a desirable communication interface to transmit data according to the present invention.

Figure 9:
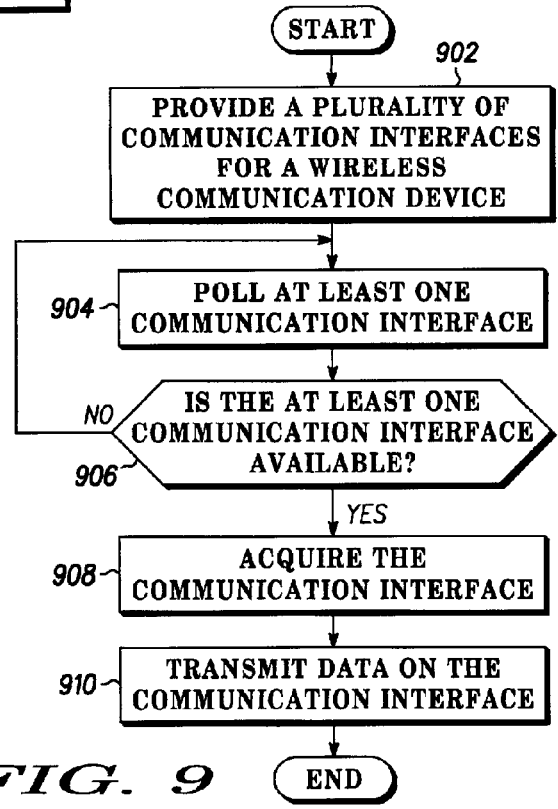
FIG. 9 is a flow chart showing a method for selecting a communication interface to transmit data in a wireless communication network according to an alternate embodiment of the present invention.

Turning now to FIG. 9, a flow chart shows a method for selecting a communication interface to transmit data in a wireless communication network according to an alternate embodiment of the present invention. In particular, a plurality of communication interfaces, such as the communication interfaces related to user node 108 and described in reference to FIG. 2, are provided for a wireless communication device, such as user node 108, at a step 902. At least one communication interface is then polled by an application, such as an application described in reference to FIG. 3, at a step 904. It is then determined whether the at least one communication interface is available at a step 906. For example, assuming that the wireless communication device is within range of the communication network associated with an acceptable communication interface, it is determined whether the communication interface is already in use by another application. If the at least one communication interface is available, the at least one communication interface is acquired at a step 908 and data is transmitted on the communication interface at a step 910.

It can therefore be appreciated that a new and novel method of optimizing the transmission of data in a wireless communication network has been described. It will be appreciated by those skilled in the art that, given the teaching herein, numerous alternatives and equivalent will be seen to exist which incorporate the disclosed invention. As a result, the invention is not to be limited by the foregoing exemplary embodiments, but only by the following claims.

We claim:

1. A method of transmitting data, said method comprising the steps of:

transmitting a first block of data associated with a first application on a first communication interface for a first period of time which is less than a predetermined period of time to transmit data on said first communication interface;

determining if a second block of data associated with a second application is available to be transmitted on said first communication interface;

transmitting at least a portion of said second block of data on said first communication interface for at least a portion of said predetermined time to transmit data on said first communication interface; and acquiring said first communication interface for said predetermined period of time at a predetermined cost.

2. The method of claim 1 wherein said step of transmitting a first block of data comprises transmitting said first block of data at said predetermined cost.

3. A method of transmitting data, said method comprising the steps of:

transmitting a first block of data associated with a first application on a first communication interface for a first period of time which is less than a predetermined period of time to transmit data on said first communication interface;

determining if a second block of data associated with a second application is available to be transmitted on said first communication interface;

transmitting at least a portion of said second block of data on said first communication interface for at least a portion of said predetermined time to transmit data on said first communication interface; and determining whether a cost of transmitting data on said first communication interface is greater than a maximum cost for transmitting data associated with said second application.

4. The method of claim 3 further comprising a step of determining whether said second block of data is transmitted on said first communication interface at a second cost which is less than said cost of transmitting data on said first communication interface.

5. A method of transmitting data, said method comprising the steps of:

transmitting a first block of data associated with a first application on a first communication interface for a first period of time which is less than a predetermined period of time to transmit data on said first communication interface;

determining if a second block of data associated with a second application is available to be transmitted on said first communication interface;

transmitting at least a portion of said second block of data on said first communication interface for at least a portion of said predetermined time to transmit data on said first communication interface; and transmitting a remaining portion of said second block of data on a second communication interface at a second predetermined cost.

* * * * *